US010235078B2

(12) United States Patent
Herrell et al.

(10) Patent No.: US 10,235,078 B2
(45) Date of Patent: Mar. 19, 2019

(54) META-DATA BLOCK WITHIN A NON-VOLATILE MEMORY DEVICE

(71) Applicant: HEWLETT PACKARD ENTERPRISE DEVELOPMENT LP, Houston, TX (US)

(72) Inventors: Russ W. Herrell, Fort Collins, CO (US); Greg Astfalk, Plano, TX (US); Gregg B. Lesartre, Fort Collins, CO (US); Andrew R. Wheeler, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/518,209

(22) PCT Filed: Oct. 31, 2014

(86) PCT No.: PCT/US2014/063535
§ 371 (c)(1),
(2) Date: Apr. 10, 2017

(87) PCT Pub. No.: WO2016/069015
PCT Pub. Date: May 6, 2016

(65) Prior Publication Data
US 2017/0315729 A1    Nov. 2, 2017

(51) Int. Cl.
*G06F 3/06*     (2006.01)
*G06F 12/02*    (2006.01)

(52) U.S. Cl.
CPC .......... *G06F 3/064* (2013.01); *G06F 3/0604* (2013.01); *G06F 3/0679* (2013.01); *G06F 12/0238* (2013.01); *G06F 2212/7207* (2013.01)

(58) Field of Classification Search
CPC ...... G06F 3/0679; G06F 3/064; G06F 3/0604; G06F 12/0238; G06F 2212/7207
(Continued)

(56) References Cited

U.S. PATENT DOCUMENTS 7,873,619 B1    1/2011    Faibish et al.
8,458,433 B2    6/2013    Barsness et al.
(Continued)

FOREIGN PATENT DOCUMENTS

WO    WO-0195137 A2    12/2001

OTHER PUBLICATIONS

Greenan, K.M. et al., "Reliability Mechanisms for File Systems Using Non-volatile Memory as a Metadata Store," (Research Paper), Oct. 22-25, 2006, 10 pages.
(Continued)

*Primary Examiner* — Hua J Song
(74) *Attorney, Agent, or Firm* — International IP Law Group, PLLC

(57) ABSTRACT

Example implementations relate to a method of tracking data in a non-volatile memory device (NVM) device. A meta-data block from the NVM device is obtained, where the meta-data block includes meta-data. The meta-data block from the NVM device is used to track an associated data object, meta-data in the data block, a user data block, a meta-data block, or an additional data block. The meta-data block from the NVM device is used to point to the associated data object, the meta-data in the data block, the user data block, the meta-data block, or the additional data block. The meta-data block from the NVM device is further used to link the associated data object, the meta-data in the data block, the user data block, the meta-data block, or the additional data block.

18 Claims, 8 Drawing Sheets

(58) Field of Classification Search
USPC .......................................................... 711/103
See application file for complete search history.

(56) References Cited

U.S. PATENT DOCUMENTS

| | | | |
|---|---|---|---|
| 8,661,068 | B1 | 2/2014 | Seibel et al. |
| 9,934,140 | B1* | 4/2018 | Pawar .................. G06F 12/0246 711/103 |
| 2007/0260809 | A1* | 11/2007 | Hara .................. H04N 1/00236 711/101 |
| 2008/0082773 | A1 | 4/2008 | Tomlin et al. |
| 2010/0250867 | A1 | 9/2010 | Bettger et al. |
| 2012/0198123 | A1 | 8/2012 | Post |
| 2012/0290781 | A1 | 11/2012 | Seo et al. |
| 2012/0296944 | A1 | 11/2012 | Thelen |
| 2014/0108709 | A1 | 4/2014 | Barrall et al. |
| 2014/0310483 | A1 | 10/2014 | Bennett |

OTHER PUBLICATIONS

International Search Report & Written Opinion received in PCT Application No. PCT/US2014/063535, dated Jul. 16, 2015, 10 pages.

* cited by examiner

200A

200B

400

META-DATA BLOCK WITHIN A NON-VOLATILE MEMORY DEVICE

BACKGROUND

Application computing and storage solutions often treat the creation and modification of data as a run-time computing issue during memory-system operations and the permanent storage of that data as a storage management issue during file-system operations. For example, in an operating system, the file-system operations may track data in persistent memory across reboots and power loss while the memory-system operations may track data only while the operating system is running. Thus, the creation and modification of data in the memory-system is not considered persistent until committed to a persistent data object in the file-system.

BRIEF DESCRIPTION OF THE DRAWINGS

The advantages of the present techniques are better understood by referring to the following detailed description and the attached figures, in which.

DETAILED DESCRIPTION

A file system may track data in persistent memory during a system power-loss or shut-down. As a result, meta-data associated with the file system may also be persistent and distributed across elements of a storage array. A memory system of an application may track data objects during system operations. Further, application meta-data associated with the data objects may exist during such operations. However, unlike the meta-data associated with the file system, the application meta-data may only persist during the manipulation of those data objects. If the data objects are saved to storage, the application meta-data will also be saved to storage or discarded without further use. Accordingly, the file system meta-data, which is stored separately from the application meta-data, embodies different attributes of persistence, latency, and bandwidth, among others, from the application meta-data.

It may be advantageous to utilize a persistent memory device as the main memory for a computing system, including the operating system. As a result, when both memory operations and file storage operations of the operating system are merged into the same hardware, the memory-system operations policies and the file-system operations policies of the operating system may co-exist within the persistent memory device.

Examples described herein provide a non-volatile memory (NVM) device that includes a meta-data block region of NVM, or a block of data. As further described herein, the meta-data region of NVM is referred to as a mnode that includes both a pointer to a target memory location and a header, which includes descriptive information, for example, about the target memory location and the mnode. Further, the mnode includes meta-data related to memory-system operations and file-system operations. In particular, the meta-data of the mnode may include file-system meta-data, application-system meta-data, or meta-data about a data object, or in any combination, thereof. As a result, the meta-data of the mnode merges both file-system data and application-system data, among other types of data, so that the merged data is stored in a persistent memory address space of the NVM device. In some cases, several mnodes may be distributed proportionally among the NVM device.

Figure 1:
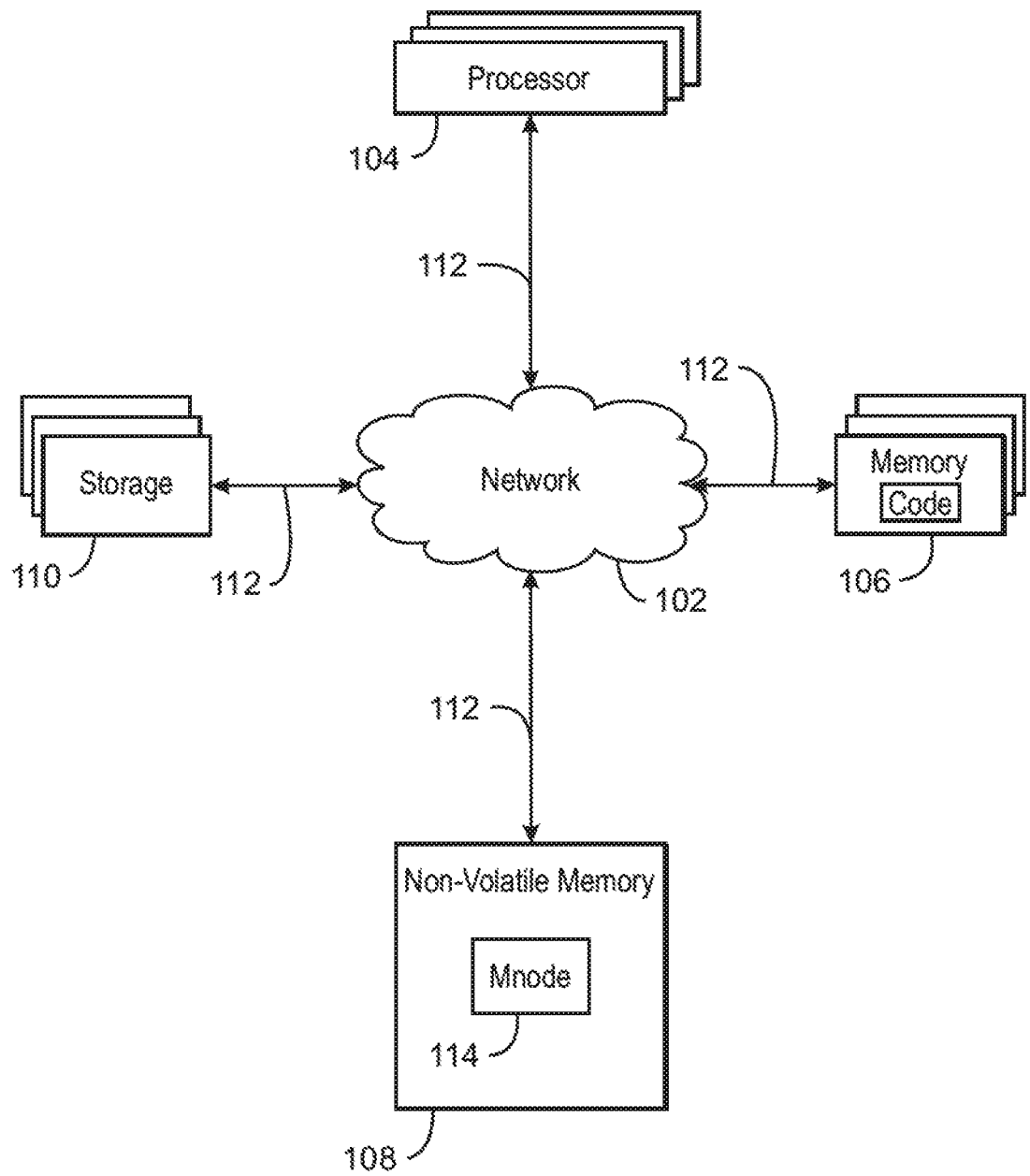
FIG. 1 is a block diagram of a computing system that includes a non-volatile memory (NVM) device.

FIG. 1 is a block diagram of a computing system 100 that includes a non-volatile memory (NVM) device. A network 102 of the computing system 100 may be connected to a collection of computing devices, including at least one or more processors 104, at least one or more memory devices 106, a non-volatile memory (NVM) device 108, and at least one or more storage devices 110. The network 102 can be a local area network, a wide area network, such as the Internet, or another network configuration available commercially off the shelf or proprietary. In particular, the network 102 may be a server cluster interconnect to house a group of network servers in one location. The server cluster may be used to distribute the workload between the individual servers of the cluster and thus, increase computing process times. For example, the individual servers may accomplish various tasks such as tracking demand for processing power from different servers within the cluster or prioritizing the various tasks among the group of network servers within the cluster. To assist with communication between different parts of the network 102, the network 102 may include routers, switches, modems, or any other kind of interface device used for interconnection. The processors 104 can be connected through a bus 112 to the network 102 to execute stored instructions. The processors 104 can include single core processors, or multi-core processors, or any combinations thereof.

The memory devices 106 can be used to store the instructions that are executed by the processors 104. The memory devices 106 can be connected to the network 102 via the bus 112. The memory devices 106 can include volatile memory and non-volatile memory including random access memory (RAM), read only memory (ROM), flash memory, solid-state disk drives, or any other suitable memory systems. In an example, the memory device 106 is a tangible, non-transitory, machine-readable medium, and thus, can include machine readable instructions, for example, operation specific code used in examples of the present techniques.

The computing system 100 may include a combined storage environment and memory environment to generate a storage and memory hardware system, e.g., a persistent memory subsystem, for long-term persistent storage. Specifically, the computing system 100 may use the NVM device 108 as the main memory for the computing system 100 where the memory-system operations, such as application computing functions, and the file-system operations, such as storage functions, may be merged on the NVM device 108. As a result, the policies of both the memory-system operations and the file-system operations may co-exist within the NVM device 108, along with corresponding persistent data for each system, in the form of a data block, e.g., mnode 114. In the present techniques, the mnode 114 is a memory-mapped storage structure composed of meta-data regions of NVM. The NVM device 108 can include static random access memory (RAM) or non-volatile random-access memory (NVRAM). The NVM device 108 may be connected to the network 102 via the bus 112.

The storage device 110 may include a long term storage system such as a hard drive, an optical drive, a flash drive, an array of drives, or any combinations thereof. As illustrated, the storage device 110 can be connected through the bus 112 to the network 102. The bus 112 can include a PCI, ISA, PCI-Express, HyperTransport®, NuBus, proprietary protocols, etc.

It is to be understood that the block diagram of FIG. 1 is not intended to indicate that the computing system 100 is to include all of the components shown in FIG. 1 in every case. Further, any number of additional components can be included within the computing system 100, depending on the details of the specific implementation.

Figure 2A:
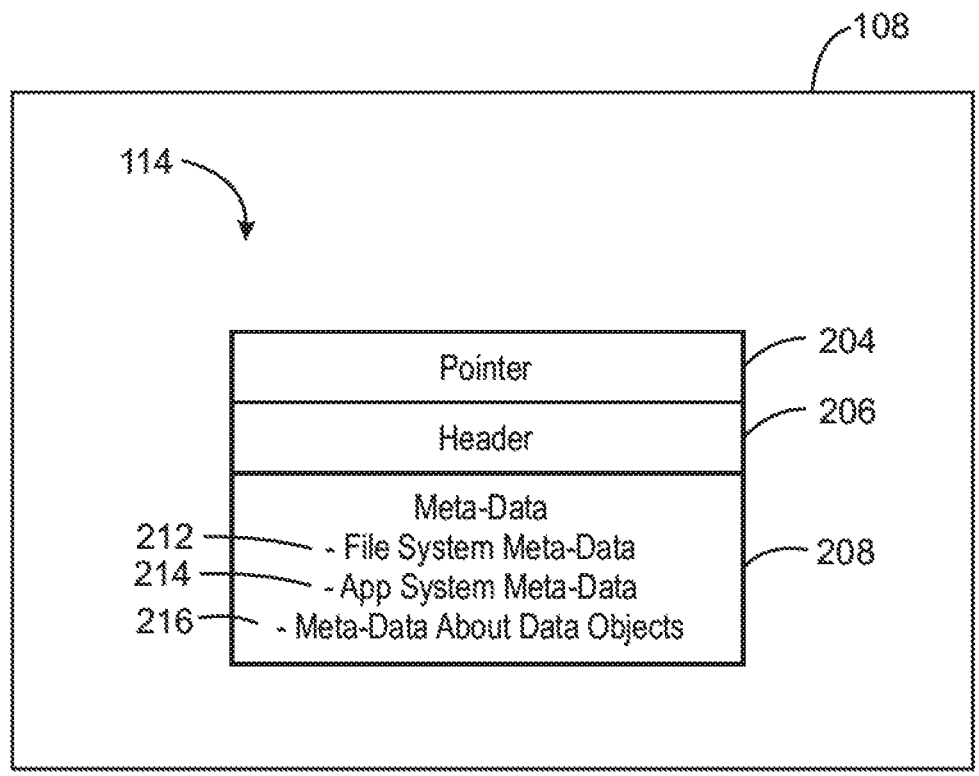
FIGS. 2A and 2B are illustrations of a meta-data region of NVM.
Figure 2B:
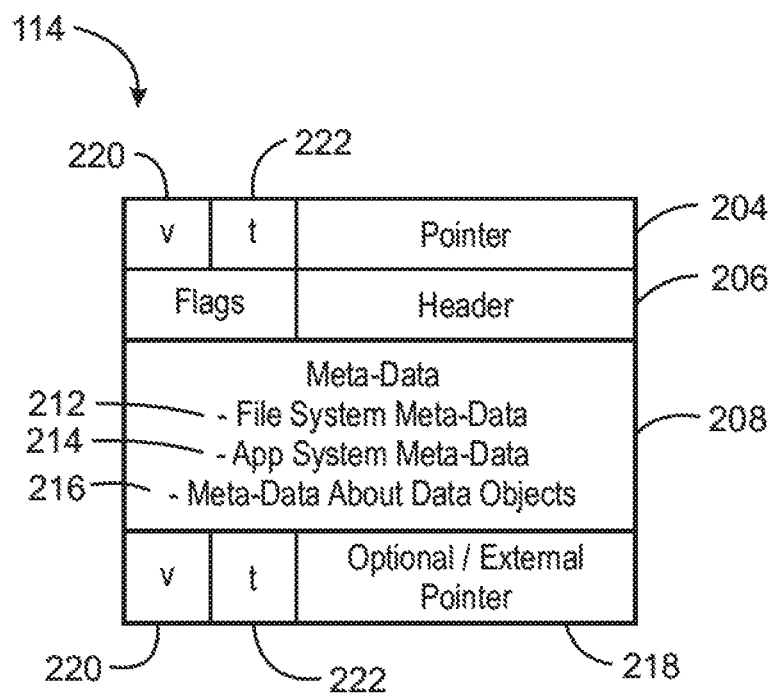

FIGS. 2A and 2B are illustrations of a meta-data region of NVM. Like numbered items are as described with respect to FIG. 1. The NVM device 108 of FIG. 1 may contain a number of meta-data regions of NVM or as referenced herein as, mnodes 114. As shown in FIG. 2A, the NVM device 108 includes the mnode 114. The mnode 114 is a data block of information that includes a pointer 204, a header 206, and meta-data 208 located within a memory-address space of the NVM device 108. The meta-data 208 may include file-system meta-data 212, application-system meta-data 214, and meta-data about data objects 216 in a storage device.

The mnode 114, as shown in FIG. 2B, may contain additional features. For example, the header data may indicate a number of optional/external pointers 218 contained in the mnode 114. In some cases, the pointers 204 and 218 may include a flag, for example, a valid ("v") flag 220 or a type ("t") flag 222. For example, the v flag 220 can alert a user of a pointer and that the pointer may be a valid pointer to another block of data of the type indicated by the t flag 222.

The pointers 204 and 218 are structures, e.g., a memory address, that may be used to point to data objects in a storage device, such as user data-blocks, meta-data blocks, or other mnodes, or any combinations thereof. The pointer 204 may also point to the meta-data 208 within the mnode 114, and thus, also point to the file-system meta-data 212, the application-system meta-data 214, and the meta-data about data objects 216 in a storage device. The optional/external pointer 218 may be used to enable the mnode 114 to point to one or more data blocks. As a result, the mnode 114 may be linked to additional mnodes or data-blocks.

The header 206 may contain general information, such as attributes related to the data objects, the meta-data 208 within the mnode 114, the user data-blocks, and the meta-data blocks, among others local data blocks. For example, the header 206 may include information related to the structure and size of the mnode 114, the block address of the data objects in the storage device, the tracking information related to end data objects, or the location of the meta-data associated with the mnode 114, among other characteristics.

As one type of data in the meta-data 208, the file-system meta-data 212 may include meta-data related to a data object such as timestamp information as to when the data object was created or last accessed. In some cases, several NVM devices 108 may exist, thus, the file-system meta-data 212 may be used to track the NVM devices 108 associated with various data objects and other meta-data blocks. In the present examples, the file-system meta-data 212 may track meta-data in the NVM device 108 across system reboots and power loss. As a result, the file-system meta-data 212 can be persistent in nature.

Application-system meta-data may be related to data objects and thus, is often created in volatile memory. As a result, the application-system meta-data may only persist during the manipulation of data objects in main memory. To save the application-system meta-data for later usage, it must be saved to storage with the data object or discarded, and thus, unusable. However, as described by the present techniques, the application-system meta-data 214 can be stored in the mnode 114 and thus, it may be persistent in nature during system reboots and power cycles.

The application system meta-data 214 is data related to an application code. In particular, the application system meta-data 214 may relate directly to an application server instance, such as OS page tables that can map blocks of NVM storage into a virtual address space of an application, unique search results created by the application, or temporary working data structures.

Further, the application-system meta-data 214 stored in the mnode 114 may be accessed by other applications or a storage manager. For example, an application may provide data objects to a storage media and may define a particular method that can be applied to such data objects. When the particular method is applied to the data objects, the results of the actions may be written into a result cache area and linked to the original data objects using the application-system meta-data 214. In the NVM device 108, the result cache area may be persistent across system reboots and power cycles so that future applications associated with the particular method may also use the result cache area.

A data object, as used herein, may represent a unit of data, such as a volume descriptor, a list, a file name, a database table, or security information, among others. The data object, or a portion of the data object, may be stored in the NVM device 108. Additionally, the meta-data that tracks the data object, e.g., the meta-data about data objects 216, may also be stored in the mnode 114. Thus, the meta-data about data objects 216 may be defined as data specifically related to a data object or a class of data objects. For example, if a data object has a compression algorithm associated with it, any parameter data (e.g., block length, pointers to scratch spaces, check sums) that describes the compression algorithm is included as meta-data about data-objects 216. The meta-data about data objects 216, within the mnode 214, can persist during the duration of the data object and can exist in whatever domains the data object exists.

Figure 3:
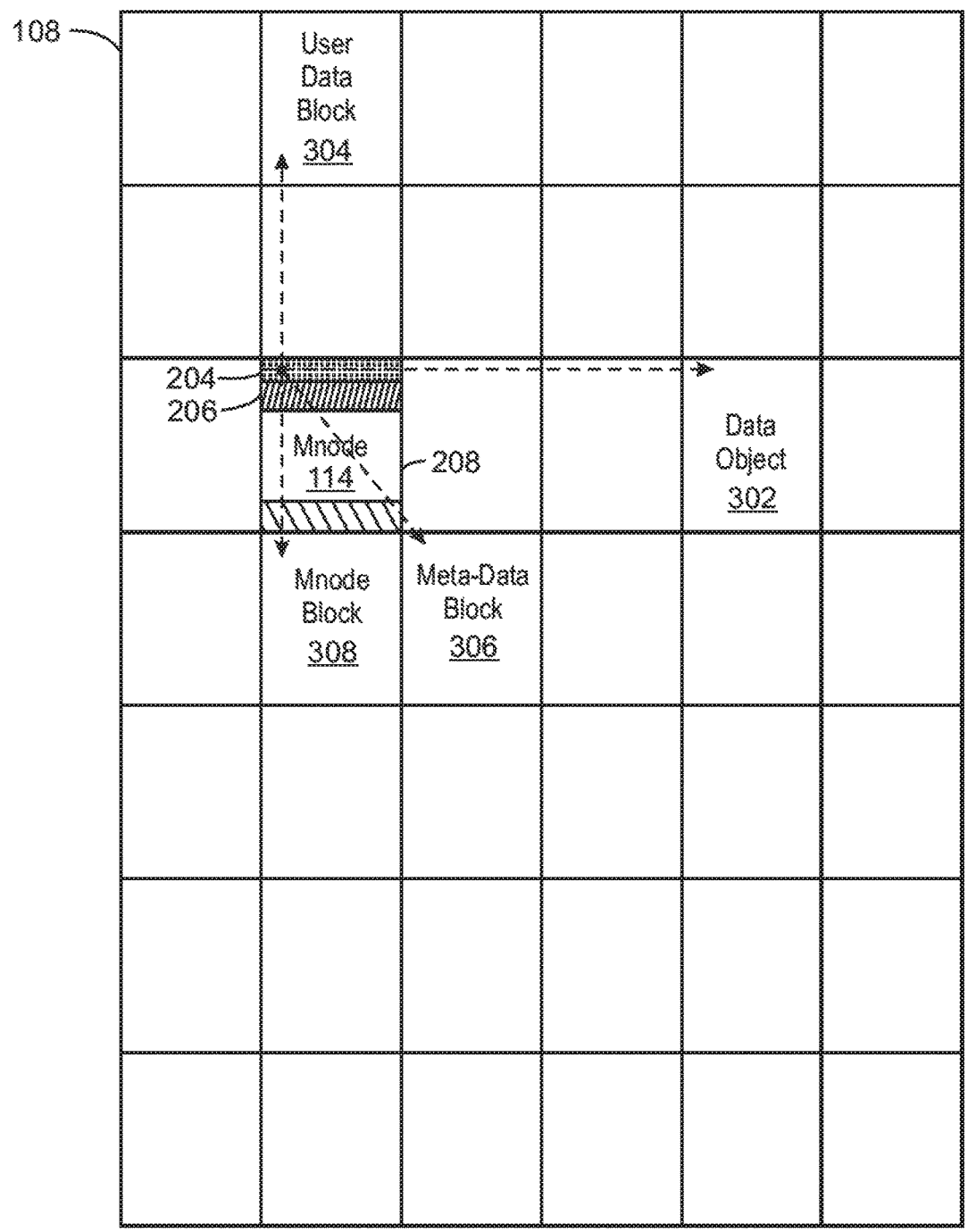
FIG. 3 is a block diagram of the NVM device containing a mnode.

FIG. 3 is a block diagram of the NVM device 108 containing a mnode 114. Like numbered items are as described with respect to FIGS. 1 and 2. The NVM device 108 of the present techniques may be a persistent memory subsystem that includes both storage operations and application computing operations within a single environment. In operation, the NVM device 108 may be collective composed of numerous NVM devices. Meta-data may often accompany both the storage operations and the application computing operations. Thus, within the NVM device 108, the mnode 114 may merge and contain the meta-data associated with the storage operations (e.g., file-system meta-data), the meta-data associated with the application computing operations (e.g., application-system meta-data), and meta-data about data-objects. The merger of such various types of meta-data may provide any software or hardware processes associated with the NVM device 108 the benefit of accessibility to the meta-data in a single location.

As described with respect to FIG. 2, the mnode 114 includes a pointer 204, a header 206, and meta-data 208, among other features. The pointer 204 may point to a data object 302 stored in a storage device, a user data block 304, a meta-data block 306, or another mnode block 308. In some aspects, a number of mnodes 114 can be distributed proportionately throughout the NVM device 108, where an increase in the number of mnodes 114 can expand the meta-data tracking capacity of the NVM device 108 to provide for the tracking of additional meta-data 208 and object data blocks.

The meta-data 208 may have its own security and permission requirements that can be managed consistently with security and permission policies of the data object 302 that it describes, as well as with the policies of the entire NVM device 108. Additionally, meta-data 208 defined by the application computing operations but required by the storage operations can be updated by the application computing operations and read or executed by the storage operations. For example, a data object 302 that can be sorted by values in certain fields may include a method that defines the fields, the data format of the fields, and the executable code used for sorting.

Figure 4:
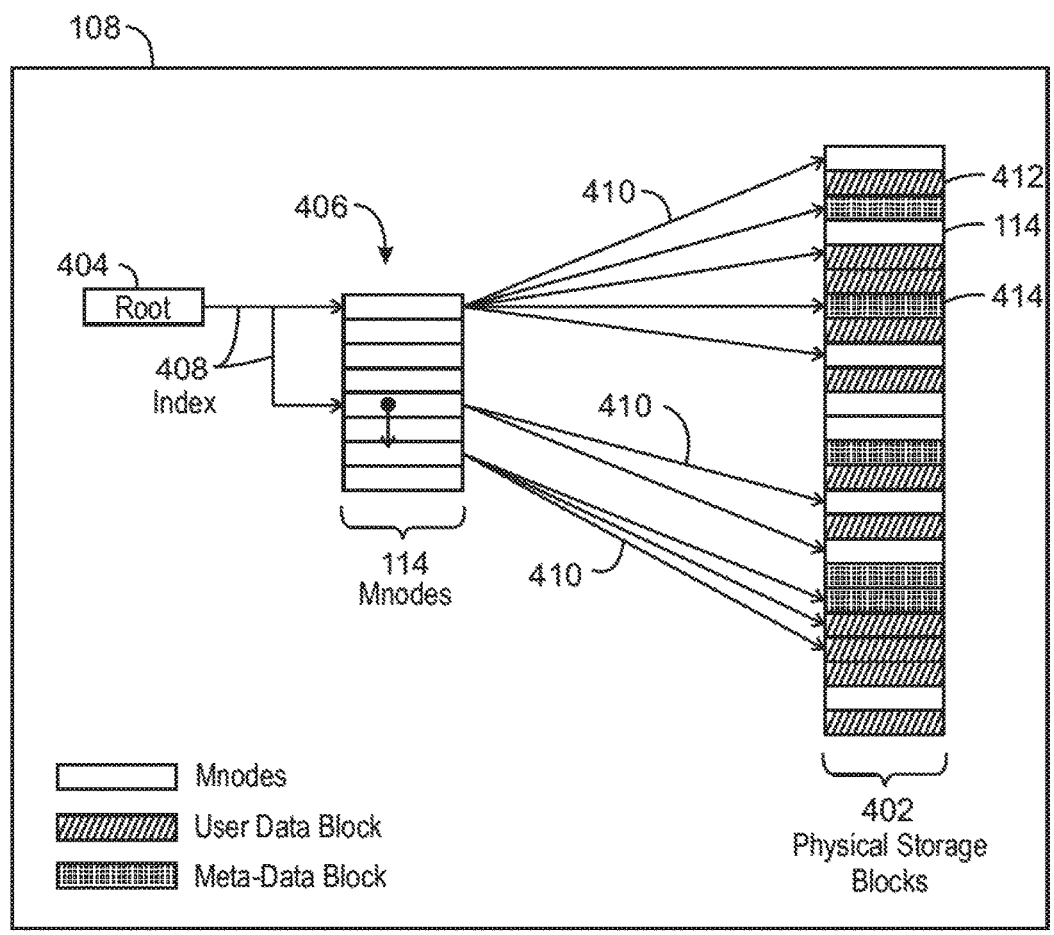
FIG. 4 is an illustration of a global view of NVM blocks of the NVM device.

FIG. 4 is an illustration of a global view of NVM blocks 402 of the NVM device 108. Like numbered items are as described with respect to FIG. 1. As shown in FIG. 4, a root 404 of a mnode-linked table 406 is provided within the NVM device 108. The root 404 may indicate the starting location of the mnode-linked table 406, which is composed of mnodes 114 arranged in a block segment. The root 404 may include an index 408. In particular, the index 408 may be used as a type of pointer to point to specific mnodes 114 within the mnode-linked table 406. The index 408 may improve the speed of mnode retrieval within the mnode-linked table 406. In some cases, the mnode-linked table 406 may not reside within the NVM device 108. However, in the case where the mnode-linked table 406 does reside in the NVM device 108, as depicted in FIG. 4, the table 406 may appear as a block address space (e.g., an offset) of the device 108.

Pointers 410, as discussed with respect to FIG. 2, in each of the mnodes 114 may point to the NVM blocks 402 in the storage space of the NVM device 108. Each NVM block 402 may include a fixed amount of storage, e.g., "N" bytes of data. Thus, each NVM block 402 may represent contiguous "N" bytes of storage in a global address map for the NVM device 108 and may reside within a single identification (ID) on the NVM device 108.

Any NVM block 402 may be a user data block 412, a meta-data block 414, or a mnode 114. Additionally, every NVM block 402 has mnodes 114 that tracks its relationship to the global NVM address map, flags and attributes about the data contained within the NVM blocks 402, and its association with other blocks of data.

Figure 5:
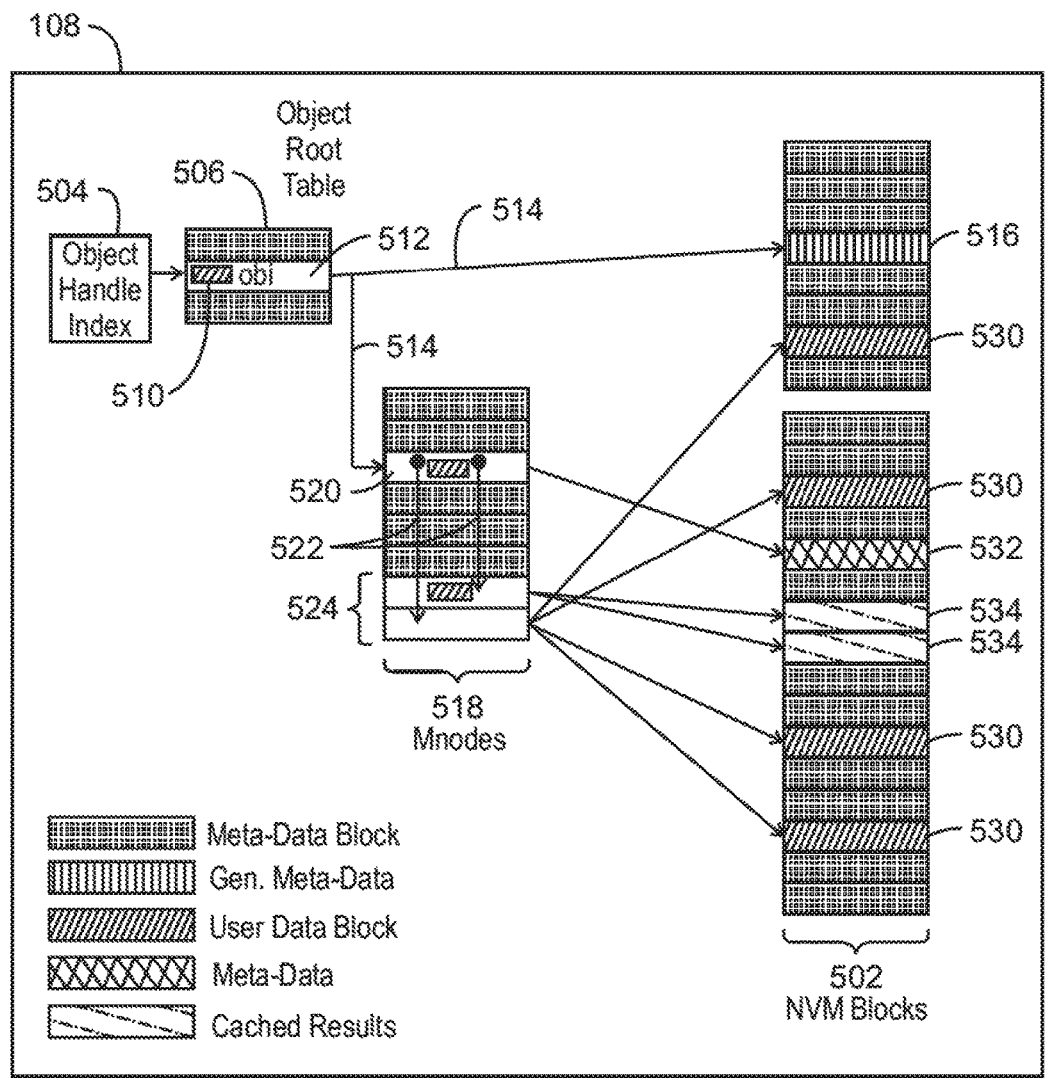
FIG. 5 is an illustration of a global view of NVM blocks of the NVM device in relationship to data object mapping.

FIG. 5 is an illustration of a global view of NVM blocks 502 of the NVM device 108 in relationship to data object mapping. An object handle index 504 may be used as a pointer to point to an object root table 506. A mnode for "Obj" 510 may be located in the object root table 506. Further, the object root table 506 may provide mnodes, for example, first level mnodes 512, that contain pointers 514. In particular, the pointers 514 may point to general class specific meta-data 516 and to the start of a mnode list 518, which may describe a data object associated with the object handle index 504. The general class meta-data 516 may include methods for shorthand compression of typical search results on data objects of a specific type. The class meta-data 516 may be located in the NVM blocks 502. Meta-data relevant to the entire data object, for example, such as revision information, may be made available in the mnode list 518.

As shown in FIG. 5, subsequent mnodes 520 in the mnode list 518 contain pointers 522 that point to additional mnode blocks 524. The additional mnode blocks 524 may point to user data blocks 530. Additionally, the subsequent mnodes 520 may point to meta-data 532 associated with the data object, such as RAID and method logs, that can be stored in the NVM blocks 502. Moreover, the results related to the execution of the data object method may be stored as cached results 534 in the NVM blocks 502 via the additional mnode blocks 524. Thus, the results may be persistent after an application has terminated.

Figure 6:
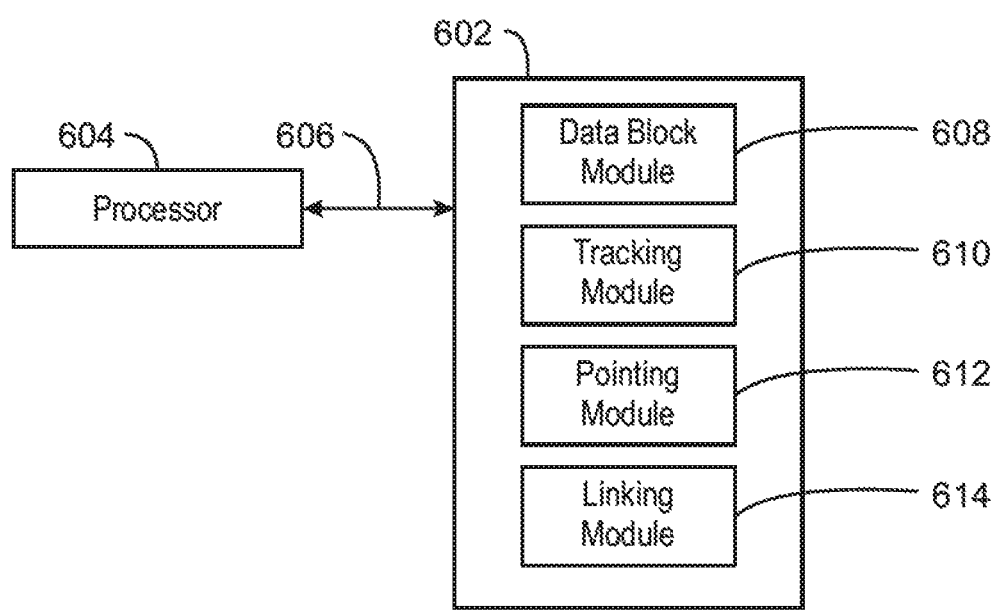
FIG. 6 is a block diagram of a tangible, non-transitory computer-readable medium.

FIG. 6 is a block diagram 600 of a tangible, non-transitory computer-readable medium 602. The tangible, non-transitory computer-readable medium 602 may be accessed by a processor 604 over a computer bus 606. Further, the tangible, non-transitory computer-readable medium 602 may include code configured to direct the processor 604 to perform the method described herein. For example, each module of the medium 602 may include code configured to track, point, or link meta-data blocks, in any combination, thereof.

A data block module 608 may be configured with operation specific code to obtain a meta-data block from a non-volatile memory device, where the meta-data block includes meta-data. A tracking module 610 may be configured with operation specific code to track an associated data object, meta-data in the data block, a user data block, a meta-data block, or an additional data block, or in any combination, using the meta-data block from the non-volatile memory device. A pointing module 612 may be configured with operation specific code to point to the associated data object, the meta-data in the data block, the user data block, the meta-data block, or the additional data block, or in any combination, using the meta-data block from the non-volatile memory device. A linking module 614 may be configured with operation specific code to link the associated data object, the meta-data in the data block, the user data block, the meta-data block, or the additional data block, or in any combination, using the meta-data block from the non-volatile memory device.

The block diagram of FIG. 6 is not intended to indicate that the tangible, non-transitory computer-readable medium 602 is to include all of the components shown in FIG. 6. Further, the block diagram 600 may include any number of additional components not shown in FIG. 6, depending on the details of the specific implementation.

Figure 7:
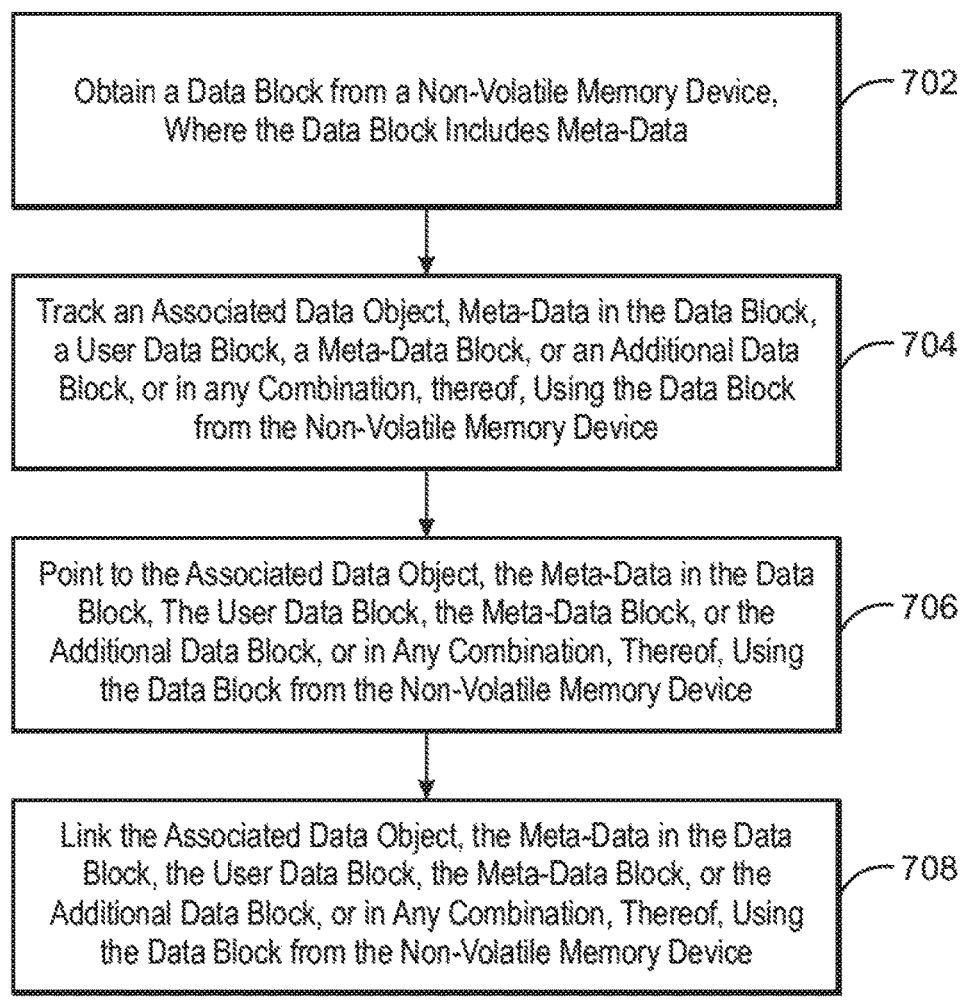
FIG. 7 is a method of tracking data in a NVM device.

FIG. 7 is a process flow diagram 700 of a method for tracking data in a NVM device. A block 702, a data block may be obtained from the NVM device, where the data block includes meta-data. At block 704, an associated data object, meta-data in the data block, a user data block, a meta-data block, and an additional data block, or in any combination, may be tracked using the data block from the NVM device. At block 706, the data block from the NVM device may be used to point to the associated data object, the meta-data in the data block, the user data block, the meta-data block, and the additional data block, or in any combination. At block 708, the associated data object, the meta-data in the data block, the user data block, the meta-data block, and the additional data block, or in any combination, may be linked together using the data block from the NVM device. The data-block may be a meta-data block.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A non-volatile memory device comprising:
a meta-data block, wherein the meta-data block comprises:
a pointer, wherein the pointer points to a data object located in a storage device;
a header, wherein the header comprises attributes about a local data block and the data object;
meta-data, wherein the meta-data comprises file-system meta-data, application-system meta-data, or meta-data about the data object, or any combination thereof; and
an object handle index to point to an object root table, wherein the object table comprises pointers to the associated data object, the meta-data in the meta-data block , the user data block, the another meta-data block, or the additional data block, or any combination, thereof.

2. The non-volatile memory device of claim 1, comprising an optional pointer and an external pointer.

3. The non-volatile memory device of claim 1, wherein the meta-data block comprises flags and attributes about the file-system meta-data, the application-system meta-data, or the meta-data about the data object, or any combination thereof.

4. The non-volatile memory device of claim 1, wherein the pointer points to at least one of a user data block, meta-data of the data block, or an additional data block, or any combination thereof.

5. The non-volatile memory device of claim 1, wherein the header indicates the structure of the meta-data block and the size of the meta-data block.

6. The non-volatile memory device of claim 1, wherein the application-system meta-data is retained during application system shut-down and start-up.

7. The non-volatile memory device of claim 1, wherein a plurality of meta-data blocks are collected into tables, wherein each of the plurality of meta-data blocks comprises a fixed size.

8. The non-volatile memory device of claim 7, wherein the second meta-data block includes pointers.

9. The non-volatile memory device of claim 8, wherein the pointers in the second meta-data block include a pointer to a starting meta-data block of the tables.

10. The non-volatile memory device of claim 9, wherein meta-data blocks subsequent to the starting meta-block include pointers to a next meta-data block in the tables.

11. The non-volatile memory device of claim 8, wherein the pointers in the second meta-data block include a pointer to a general meta-data block.

12. The non-volatile memory device of claim 11, wherein the user data block includes general class specific meta-data.

13. A method of tracking data in a non-volatile memory device, comprising:
obtaining a meta-data block from the non-volatile memory device;
tracking an associated data object, meta-data in the meta-data block, a user data block, another meta-data block, or an additional data block, or in any combination, thereof, using the meta-data block from the non-volatile memory device;
pointing to the associated data object, the meta-data in the meta-data block, the user data block, the another meta-data block, or the additional data block, or in any combination, thereof, using the meta-data block from the non-volatile memory device;
linking the associated data object, the meta-data in the meta-data block, the user data block, the another meta-data block, or the additional data block, or in any combination, thereof, using the meta-data block from the non-volatile memory device; and
converting an object handle into an entry of an object root table, wherein after converting an object handle into an entry of an object root table, the entry of the object root table comprises pointers to the associated data object, the meta-data in the meta-data block, the user data block, the another meta-data block, or the additional data block, or any combination, thereof.

14. The method of claim 13, wherein the associated data object, the meta-data of the meta-data block, the user data block, the another meta-data block, or the additional data block, or any combination, thereof, are located in an address space of the non-volatile memory device.

15. The method of claim 14, wherein the associated data object, the meta-data in the meta-data block, the user data block, the another meta-data block, and the additional data blocks, or any combination, thereof, comprise storage operations, application operations, or both.

16. The method of claim 14, comprising obtaining a meta-data block from a location external to the non-volatile memory device.

17. A tangible, non-transitory, computer readable medium comprising code configured to direct a processor to:
obtain a meta-data block from a non-volatile memory device;
track an associated data object, meta-data in the meta-data block, a user data block, a meta-data block, or an additional data block, or in any combination, thereof, using the meta-data block from the non-volatile memory device;
point to the associated data object, the meta-data in the meat-data block, the user data block, the meta-data block, or the additional data block, or in any combination, thereof, using the meta-data block from the non-volatile memory device;
link the associated data object, the meta-data in the meta-data block, the user data block, the meta-data block, or the additional data block, or in any combination, thereof, using the meta-data block from the non-volatile memory device; and
converting an object handle into an entry of an object root table, wherein after converting an object handle into an entry of an object root table, the entry of the object root table comprises pointers to the associated data object, the meta-data in the meta-data block, the user data block, the meta-data block, or the additional data block, or any combination, thereof.

18. The tangible, non-transitory, computer readable medium of claim 17, comprising code configured to direct the processor to simultaneously process and manipulate the associated data object, the meta-data in the data block, the user data block, the meta-data block, and the additional data block, or any combination, thereof.

* * * * *